United States Patent
Ho et al.

(10) Patent No.: US 8,830,941 B2
(45) Date of Patent: Sep. 9, 2014

(54) TURBO MODES FOR BAN-BASED COMMUNICATIONS

(75) Inventors: Jin-Meng Ho, Plano, TX (US); Gangadhar Burra, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 92 days.

(21) Appl. No.: 13/614,464

(22) Filed: Sep. 13, 2012

(65) Prior Publication Data
US 2013/0064235 A1    Mar. 14, 2013

Related U.S. Application Data

(60) Provisional application No. 61/534,412, filed on Sep. 14, 2011.

(51) Int. Cl.
*H04W 4/00* (2009.01)
*H04J 3/24* (2006.01)
*H04W 28/06* (2009.01)

(52) U.S. Cl.
CPC ................................. *H04W 28/06* (2013.01)
USPC ....................... 370/329; 370/338; 370/474

(58) Field of Classification Search
None
See application file for complete search history.

(56) References Cited

U.S. PATENT DOCUMENTS

2002/0199019 A1* 12/2002 Battin et al. .................. 709/245
2010/0322151 A1* 12/2010 Racz et al. .................... 370/328

OTHER PUBLICATIONS

IEEE standard for Local and metropolitan area networks, IEE Std 802.15.6-2012, Feb. 29, 2012, Part 15.6.*

* cited by examiner

*Primary Examiner* — Jutai Kao
(74) *Attorney, Agent, or Firm* — Steven A. Shaw; Frederick J. Telecky, Jr.

(57) ABSTRACT

A first device is adapted to communicate with a second device using a protocol standard. The devices exchange security and connection setup frames using a preamble format and a header format defined in the protocol standard. The connection setup frames specify a modified protocol using a truncated preamble, a shortened header, or both. The devices configure their transceivers to transmit and receive frames formatted based on the modified protocol.

17 Claims, 2 Drawing Sheets

TURBO MODES FOR BAN-BASED COMMUNICATIONS

CROSS-REFERENCE TO RELATED APPLICATIONS

This application claims the benefit of the filing date of U.S. Provisional Patent Application No. 61/534,412 which is titled "Turbo Modes for BAN Based Communications" and was filed Sep. 14, 2012, the disclosure of which is hereby incorporated by reference herein in its entirety.

BACKGROUND

In a wireless network having a star topology, a hub exchanges frames with one or more nodes. In the wireless devices representing the hub and nodes, a physical layer (PHY) is responsible for tasks such as activation and deactivation of the radio transceiver, clear channel assessment within the current channel, and data transmission and reception. The PHY also transforms a physical-layer service data unit (PSDU) into a physical-layer protocol data unit (PPDU) for transmission to other devices. The PSDU is typically pre-appended with a physical-layer preamble and a physical-layer header in order to create the PPDU. At the receiver, the physical-layer preamble and physical-layer header serve as aids in the demodulation, decoding and delivery of the PSDU.

The length of the preamble and the header (i.e., the number of bits or symbols in the preamble and/or the header) affect how much time and power is required to transmit or receive the PPDU. The length of the transmission times is proportional to the amount of power required from the wireless communication device, which is particularly important in battery-operated and portable devices. Additionally, because only one hub or node is transmitting at a time in a typical system, longer transmission times reduce opportunities for other devices to transmit during a superframe or beacon period. Accordingly, it is desirable to reduce the PPDU transmission time in order to reduce power consumption and increase device throughput.

SUMMARY

Embodiments of the invention provide reduced power consumption and faster data communication in a wireless network, such as a body area network (BAN). A first device is adapted to communicate with a second device using a protocol standard and a protocol modified therefrom. The modified protocol uses a truncated preamble or a shortened header or both. The devices configure their transceivers to transmit and receive frames formatted based on the modified protocol.

The devices may negotiate use of the modified protocol using connection setup messages. A connection request frame uses the preamble format and the header format defined in the protocol standard. The connection request frame comprises an application specific information element that requests use of the truncated preamble or the shortened header or both when transmitting subsequent frames between the first and second device during requested time intervals. A connection assignment frame also uses the preamble format and the header format defined in the protocol standard. The connection assignment frame comprises an application specific information element authorizing use of the truncated preamble or the shortened header or both when transmitting subsequent frames during assigned time intervals.

The protocol standard may be, for example, IEEE Std. 802.15.6-2012. In one embodiment, the preamble format defined in the protocol standard may comprise an extension sequence, and the truncated preamble comprises a shortened extension sequence. For example, the preamble format defined in the protocol standard may comprise 90 symbols, and the truncated preamble comprises 72 symbols. In one embodiment, the header format defined in the protocol standard uses a spreading factor of 4 or 2 and the shortened header uses a spreading factor of 2 or 1.

BRIEF DESCRIPTION OF THE DRAWINGS

Figure 1:
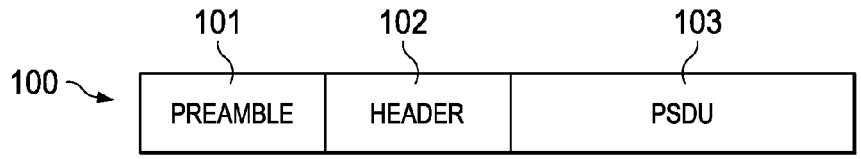

Having thus described the invention in general terms, reference will now be made to the accompanying drawings, wherein:

FIG. 1 illustrates the format for a PPDU composed of a preamble, header, and PSDU.

Figure 2:
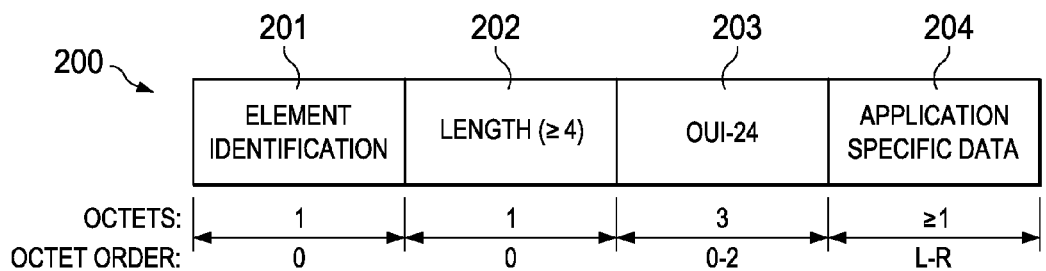

FIG. 2 illustrates an application specific IE for requesting or authorizing to use the modified PPDU format according to one embodiment.

Figure 3:
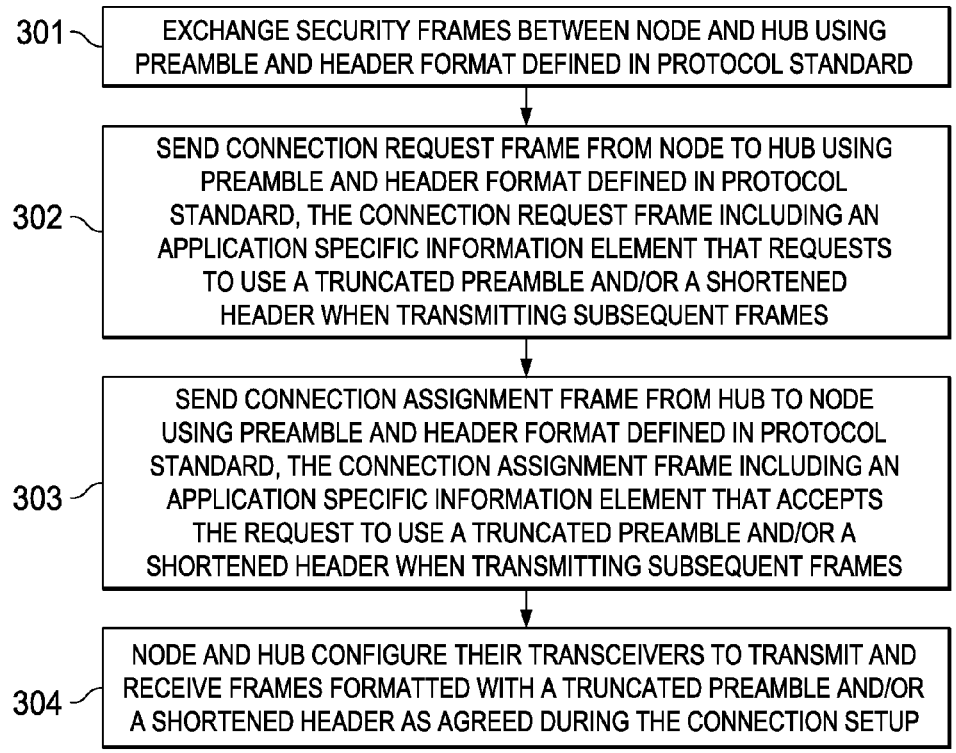

FIG. 3 is a flowchart illustrating a process or method for exchanging frames between a node and hub using a modified protocol using a truncated preamble and/or a shortened header.

Figure 4:
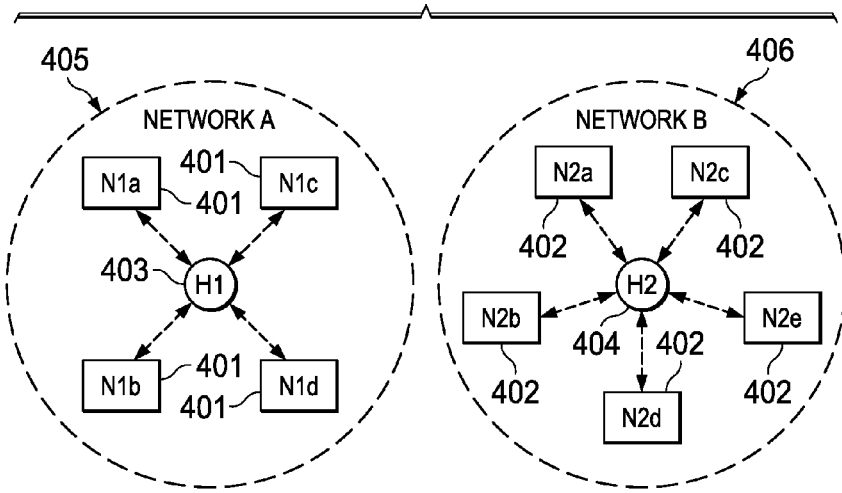

FIG. 4 is a block diagram illustrating a network topology employing embodiments of the invention.

Figure 5:
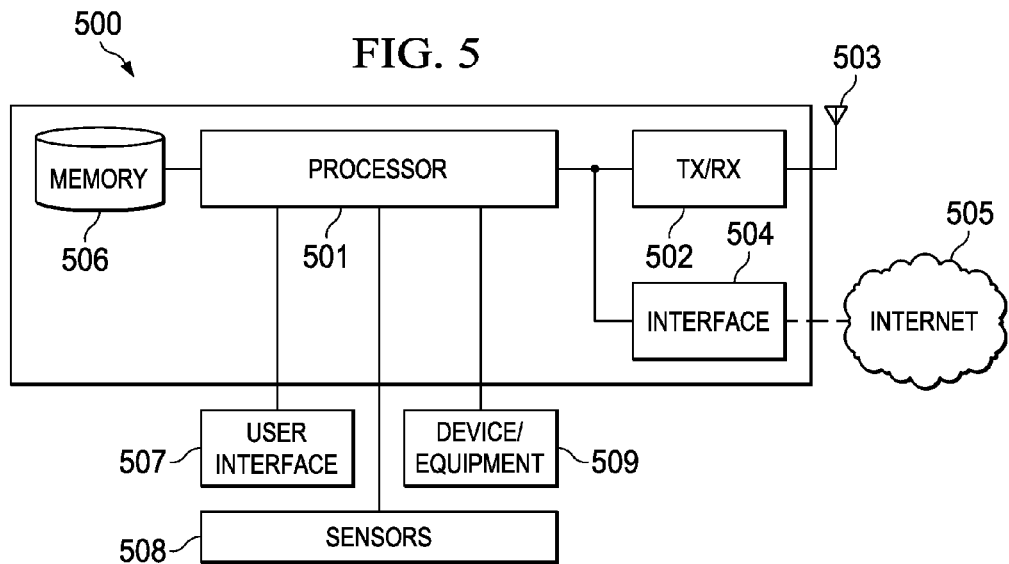

FIG. 5 is a block diagram of an exemplary embodiment of a device implementing embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates the format for a PPDU 100 composed of a preamble 101, header 102 and PSDU 103, which are listed in order of transmission. In one embodiment, for example in wireless networks complying with the IEEE Std. 802.15.6-2012 for Wireless Body Area Networks (BAN), the preamble 101 may be a physical layer convergence protocol (PLCP) preamble and the header 102 may be a PLCP header. This is illustrated, for example, in the IEEE Std. 802.15.6-2012, the disclosure of which is hereby incorporated by reference herein in its entirety.

The preamble 101 is added prior to the header and aids the receiver in packet detection, timing synchronization, and carrier-offset recovery. In the IEEE Std. 802.15.6-2012, for example, two unique preambles are defined in order to mitigate false alarms due to networks operating on adjacent channels. Each preamble is constructed by concatenating a length-63 m-sequence with a pre-defined extension sequence (e.g., 010101010101101101101101101). The resulting length of the preamble is 90 bits. The length-63 m-sequence is used for packet detection, coarse-timing synchronization, and carrier-offset recovery. The pre-defined extension sequence is used for fine-timing synchronization.

The header 102 conveys information about the PHY parameters to aid the receiver in demodulating and decoding the PSDU. In the IEEE Std. 802.15.6-2012, for example, the header is constructed for transmission based on information provided by the medium access control (MAC) sublayer, and it has 31 bits before spreading.

The PSDU 103 may be formed, for example, by combining information from the MAC sublayer, such as by concatenating a MAC header and a MAC frame body with a frame check sequence (FCS). The PSDU may then be encoded and spread/interleaved before being transmitted.

The header 102 and PSDU 103 may be transmitted using data rates that are selected based upon an operating frequency band. For example, devices compliant with the IEEE Std. 802.15.6-2012 support transmission and reception in at least one of the following frequency bands: 402-405 MHz, 420-450 MHz, 863-870 MHz, 902-928 MHz, 950-958 MHz, 2360 5-2400 MHz, and 2400-2483.5 MHz. The IEEE Std. 802.15.6-2012 sets forth data-rate dependent parameters for each of the frequency bands of operation. These data-rate dependent parameters include, for example, modulation type, symbol rate, code rate, and spreading factor. The preamble and header are transmitted at the symbol rate for the desired band of operation, i.e., at the lowest bit rate.

In the IEEE Std.802.15.6-2012, for the 2360-2400 MHz and 2400-2483.5 MHz bands, the preamble consists of 90 bits, and the header is formed with a spreading factor of 4 (i.e., a 4 times repetition). This results in over-the-air transmission times of 150 and 206.7 µs, respectively, for the preamble 101 and header 102.

In an example application, a PSDU 103 may be comprised of 6 bytes of user data plus 14 bytes of MAC header, security info, and FCS. The user data is sent in a data frame from a node to a hub, for example. The hub responds with an acknowledgment frame comprising, for example, a PSDU having 9 bytes of MAC header and FCS. Transmitted at the highest data rate, the data and acknowledgement PSDUs require a transmission time of 173.3 and 80 µs, respectively.

Accordingly, the total PPDU frame transmission time, which includes the preamble, header, and PSDU components, is 530 µs for the data frame and 436.7 µs for the acknowledgment frame.

The transmission times for the PPDU frames may be reduced if the preamble and header are shortened.

In one embodiment, the PLCP preamble defined in the IEEE Std. 802.15.6-2012 is truncated so that fewer symbols are used. For example, instead of using all 90 symbols as defined in the IEEE Std. 802.15.6-2012, only the first 72 symbols of the 90 symbols are used for the preamble. Such a truncation of the PLCP preamble has been found to have a negligible impact on robustness.

Additionally or alternatively, the PLCP header required in the IEEE Std. 802.15.6-2012 may be shortened. For example, use a spreading factor of 2 instead of 4 for the PLCP header as currently defined. The shortening of the PLCP header by reducing the spreading factor from 4 to 2 is warranted because—under the IEEE Std. 802.15.6-2012—the PSDU containing the MAC frame (i.e., the user data or acknowledgment info) has a spreading factor of 1 for the highest data rate, a spreading factor of 2 for the middle data rates, and a spreading factor of 4 for the lowest data rates. It is unlikely that the lowest data rates (i.e., 91.9 or 121.4 kbps) will be used for most applications.

With the changes indicated above, the PCLP preamble and the PLCP header will have a transmission time of 120 and 103.4 µs, respectively, instead of the transmission times of 150 and 206.7 µs as required under the published IEEE Std. 802.15.6-2012. Using both of these changes, the transmission time is reduced by 133.3 µs. Accordingly, the data and acknowledgment frames in the example above will have a transmission time of only 396.7 and 303.4 µs, respectively, compared to 530 and 436.7 µs under the published IEEE Std. 802.15.6-2012. Together, these changes reduce the over-the-air transmission time from 966.7 to 700.1 µs, which is a 27.6% reduction.

An implementation taking advantage of the truncated preamble and shortened header techniques described above could afford to lose its power efficiency by 38.1% while still being as power efficient as an implementation based on the existing standard.

In other embodiments, the spreading factor for the PLCP header may be further reduced to 1, such as when the channel between two communicating devices has a high link quality, which may occur when the devices are close in distance or for other reasons. With this further reduction in spreading factor, the data and acknowledgment frames will have transmission times of 345.0 and 251.7 µs, respectively, which provide a combined over-the-air transmission time reduction of 38.3%.

In a wireless star topology network, a node and a hub exchange frames with each other using predefined parameters, such as those defined in the IEEE Std. 802.15.6-2012. If the node and hub are capable of using other transmission parameters, such as the non-standard truncated preamble or shortened header as described above, then the node and hub must be capable of determining whether the other device is transmitting a frame based on the existing long preamble and header or a truncated preamble and/or a shortened header.

The PHY layer is generally not capable of recognizing on its own if the preamble has been truncated, or if a shortened header has been used, or both. Instead, in one embodiment, the MAC layer provides a mechanism for determining in advance when non-standard parameters are being used.

A node and a hub communicate using an existing standard to establish security keys and for connection setup. For example, the node and hub use an existing preamble and header to exchange security- and connection-related frames with each other. While establishing the connection, the node and hub exchange a connection request frame sent from the node to the hub and a connection assignment frame sent from the hub to the node. The connection request and connection assignment frames include an application specific information element (IE) that may be used to provide user-defined or application-specific information.

FIG. 2 illustrates an application specific IE 200 according to one embodiment. Element ID field 201 is set to a value that identifies the information element as an application specific IE. Length field 202 is set to the length, in octets, of application specific data field 204. OUI-24 field 203 is set to a 24-bit Organizationally Unique Identifier (OUI) assigned by the IEEE Registration Authority to the vendor or manufacturer that defines IE 200. The application specific data field 204 is set by the owner or assignee of the OUI.

Application specific data field 204 is set to indicate that the sender, which may be a node or hub, of the current frame will subsequently transmit frames to the addressed recipient, which is the corresponding hub or node, based on the truncated preamble and a specific shortened header as described above. The node and the hub will then configure their transceivers to transmit and receive frames to/from each other based on the exchanged arrangement.

Each node transmits and receives frames to/from a hub with which it has already connected. On the other hand, a hub may connect with multiple nodes in its network. Some nodes may use an existing standard, while other nodes may use the new techniques. In such a network, a node and a hub may still exchange frames based on the new techniques in their scheduled or announced time intervals. Specifically, in these time intervals, at the sender side, the MAC will instruct the PHY to use the new technique for its frame transmission. At the recipient side, the MAC will configure the PHY with the new technique for its frame reception.

The hub and node can use the modified PPDU format when both devices know that the other is capable of using this format. The devices may exchange connection setup messages with an application specific IE that indicates that the modified PPDU format should be used. Alternatively, during certain intervals, the hub may expect any node that uses that interval to be capable of the modified PPDU format.

For example, in a random access phase (RAP) or a contention access phase (CAP) as defined in the IEEE Std. 802.15.6-2012, any node may send a frame to a hub using Carrier Sense Multiple Access/Collision Avoidance (CSMA/CA). The hub does not know which node will use these phases. In one scenario, the node and hub signal that the modified PPDU format should be used using the application specific IE. In another scenario, if the hub is not anticipating or interested in receiving frames from nodes that are not using the modified PPDU format during a selected access phase, then the hub may use the modified format for its frame transmissions and reception. Any node that wants to communicate with the hub in this access phase would have to use the modified PPDU format.

FIG. 3 is a flowchart illustrating a process or method for exchanging frames between a node and hub using a modified protocol using a truncated preamble and/or a shortened header. In step 301, a hub and a node exchange security frames using a preamble and header format defined in a protocol standard with which both devices comply, if secured communication is needed. For example, in a wireless BAN, the hub and the node may comply with the IEEE Std. 802.15.6-2012. In step 302, the node sends a connection request frame to the hub using the preamble and header format defined in the protocol standard. The connection request frame includes an application specific information element, which requests the user of a truncated preamble and/or a shortened header when transmitting subsequent frames in requested time intervals.

In step 303, the hub sends a connection assignment frame to the node using the preamble and header format defined in the protocol standard. The connection assignment frame includes an application specific information element that accepts the request to use a truncated preamble and/or a shortened header when transmitting subsequent frames in assigned time intervals.

In step 304, the node and hub configure their respective transceivers to transmit and receive frames formatted with a truncated preamble and/or shortened header as agreed between the devices during connection setup.

It will be understood that steps 301-304 of the process illustrated in FIG. 3 may be executed simultaneously and/or sequentially. It will be further understood that each step may be performed in any order and may be performed once or repetitiously.

FIG. 4 is a block diagram illustrating a network topology employing embodiments of the invention. Nodes 401, 402 and hubs 403, 404 are organized into logical sets, referred to as networks. In the illustrated embodiment, there is only one hub in a network, but the number of nodes in a network may vary. For example, network A 405 comprises hub 403 and a plurality of nodes 401, and network B 406 comprises hub 404 and a plurality of nodes 402. In one embodiment, data is exchanged within the same network using modified PPDU frame format as described herein. The hubs 403, 404 and respective nodes 401, 402 may communicate using a truncated preamble and/or a shortened header if negotiated during connection setup or if the node and hub determine that they are both compliant with a modified protocol.

FIG. 5 is a block diagram of an exemplary embodiment of a device 500 implementing embodiments of the invention. Device 500 may be used as a node 401, 402 and/or a hub 403, 404 in FIG. 4. In one embodiment, device 500 is a hub, gateway, or controller controlling and communicating with one or more nodes or with other hubs using a truncated preamble and/or a shortened header. In another embodiment, device 500 is a node operating on, in, or around a human or non-human body and communicating with a hub or another node to service one or more applications, such as medical services, consumer electronics, and personal entertainment.

Processor 501 processes data exchanged with other nodes or hubs via transceiver 502 and antenna 503 and/or via wired interface 504 coupled to Internet or another network 505. Processor 501 may be a software, firmware, or hardware based device or a combination thereof. Processor 501 may also generate and process messages sent to, and received from, another device, such as using a truncated preamble and/or a shortened header as described herein.

Memory 506 may be used to store data packets, connection setup information, modified protocol specification, and/or other parameters of an enhanced BAN system. Memory 506 may also be used to store computer program instructions, software and firmware used by processor 501. It will be understood that memory 506 may be any applicable storage device, such as a fixed or removable RAM, ROM, flash memory, or disc drive that is separate from or integral to processor 501.

Device 500 may be coupled to other devices, such as user interface 507, sensors 508, or other devices or equipment 509. Device 500 may be adapted to operate in a body area network either as a node or as a hub controlling a plurality of nodes and coordinating with other hubs for coexistence. Sensors 508 may be used, for example, to monitor vital patient data, such as body temperature, heart rate, and respiration. Equipment 509 may be, for example, a monitor or other device that receives and analyzes signals, such as a patient's temperature, heart rate, and respiration, from another node. Alternatively, equipment 509 may be a device for providing a service to a patient, such as controlling an intravenous drip, respirator, or pacemaker.

It will be understood that the networks 405, 406 in FIG. 4 and the device 500 in FIG. 5 are presented for illustrative purposes only and are not intended to limit the scope of the systems or devices that are capable of employing the truncated preamble or shortened header formats described herein.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
in a first device adapted to communicate with a second device using a protocol standard,
configuring a transceiver in the first device to transmit and receive frames formatted with the truncated preamble or the shortened header or both;
sending a first frame to the second device, the first frame comprising the truncated preamble or the shortened header or both; and
receiving a second frame from the second device, the second frame comprising the truncated preamble or the shortened header or both, wherein the preamble format defined in the protocol standard comprises an extension sequence and the truncated preamble comprises a shortened extension sequence.

2. The method of claim 1, further comprising:
sending a connection request frame to the second device, the connection request frame using a preamble format and a header format defined in the protocol standard, the connection request frame comprising an application specific information element requesting use of a truncated preamble or a shortened header or both when transmitting subsequent frames between the first and second devices; and
receiving a connection assignment frame from the second device, the connection assignment frame using a preamble format and a header format defined in the protocol standard, the connection assignment frame comprising an application specific information element authorizing use of the truncated preamble or the shortened header or both when transmitting subsequent frames between the first and second devices.

3. The method of claim 1, wherein the protocol standard is IEEE Std. 802.15.6-2012.

4. A method, comprising:
in a first device adapted to communicate with a second device using a protocol standard,
configuring a transceiver in the first device to transmit and receive frames formatted with the truncated preamble or the shortened header or both;
sending a first frame to the second device, the first frame comprising the truncated preamble or the shortened header or both; and
receiving a second frame from the second device, the second frame comprising the truncated preamble or the shortened header or both, wherein the preamble format defined in the protocol standard comprises 90 symbols and the truncated preamble comprises first 72 symbols of the 90 symbols.

5. A method, comprising:
in a first device adapted to communicate with a second device using a protocol standard,
configuring a transceiver in the first device to transmit and receive frames formatted with the truncated preamble or the shortened header or both;
sending a first frame to the second device, the first frame comprising the truncated preamble or the shortened header or both; and
receiving a second frame from the second device, the second frame comprising the truncated preamble or the shortened header or both, wherein the header format defined in the protocol standard uses a spreading factor of 4 and the shortened header uses a spreading factor of 2 or 1.

6. A method, comprising:
in a first device adapted to communicate with a second device using a protocol standard,
configuring a transceiver in the first device to transmit and receive frames formatted with the truncated preamble or the shortened header or both;
sending a first frame to the second device, the first frame comprising the truncated preamble or the shortened header or both; and
receiving a second frame from the second device, the second frame comprising the truncated preamble or the shortened header or both, wherein the header format defined in the protocol standard uses a spreading factor of 2 and the shortened header uses a spreading factor of 1.

7. A method, comprising:
in a first device adapted to communicate with a second device using a protocol standard, configuring a transceiver in the first device to transmit and receive frames formatted with a truncated preamble or a shortened header or both, wherein the truncated preamble or the shortened header are not defined in the protocol standard;
receiving a first frame from the second device, the first frame comprising the truncated preamble or the shortened header or both; and
sending a second frame to the second device, the second frame comprising the truncated preamble or the shortened header or both, wherein the preamble format defined in the protocol standard comprises an extension sequence and the truncated preamble comprises a shortened extension sequence.

8. The method of claim 7, further comprising:
receiving a connection request frame from the second device, the connection request frame using a preamble format and a header format defined in the protocol standard, the connection request frame comprising an application specific information element requesting use of the truncated preamble or the shortened header or both when transmitting subsequent frames between the first and second devices; and
sending a connection assignment frame to the second device, the connection assignment frame using a preamble format and a header format defined in the protocol standard, the connection assignment frame comprising an application specific information element authorizing use of the truncated preamble or the shortened header or both when transmitting subsequent frames between the first and second devices.

9. The method of claim 7, wherein the protocol standard is IEEE Std. 802.15.6-2012.

10. A method, comprising:
in a first device adapted to communicate with a second device using a protocol standard, configuring a transceiver in the first device to transmit and receive frames formatted with a truncated preamble or a shortened header or both, wherein the truncated preamble or the shortened header are not defined in the protocol standard;
receiving a first frame from the second device, the first frame comprising the truncated preamble or the shortened header or both; and
sending a second frame to the second device, the second frame comprising the truncated preamble or the shortened header or both, wherein the preamble format defined in the protocol standard comprises 90 symbols and the truncated preamble comprises first 72 symbols of the 90 symbols.

11. A method, comprising:
in a first device adapted to communicate with a second device using a protocol standard, configuring a transceiver in the first device to transmit and receive frames formatted with a truncated preamble or a shortened header or both, wherein the truncated preamble or the shortened header are not defined in the protocol standard;
receiving a first frame from the second device, the first frame comprising the truncated preamble or the shortened header or both; and
sending a second frame to the second device, the second frame comprising the truncated preamble or the shortened header or both, wherein the header format defined in the protocol standard uses a spreading factor of 4 and the shortened header uses a spreading factor of 2 or 1.

12. A method, comprising:
in a first device adapted to communicate with a second device using a protocol standard, configuring a transceiver in the first device to transmit and receive frames formatted with a truncated preamble or a shortened header or both, wherein the truncated preamble or the shortened header are not defined in the protocol standard;
receiving a first frame from the second device, the first frame comprising the truncated preamble or the shortened header or both; and
sending a second frame to the second device, the second frame comprising the truncated preamble or the shortened header or both, wherein the header format defined in the protocol standard uses a spreading factor of 2 and the shortened header uses a spreading factor of 1.

13. A device, comprising:
a circuit for sending signals to and receiving signals from another device using a defined protocol standard; and
a processor adapted to perform operations on the signals sent to or received from the other device, the processor operating to:
configure the circuit in the device to transmit and receive frames formatted with a truncated preamble or a shortened header or both, wherein the truncated preamble or the shortened header are not defined in the protocol standard;
send a first frame to the other device, the first frame comprising the truncated preamble or the shortened header or both; and receive a second frame from the other device, the second frame comprising the truncated preamble or the shortened header or both, wherein the preamble format defined in the protocol standard comprises an extension sequence and the truncated preamble comprises a shortened extension sequence.

14. The device of claim 13, the processor further operating to:
send a connection request frame to the other device, the connection request frame using a preamble format and a header format defined in the protocol standard, the connection request frame comprising an application specific information element requesting use of the truncated preamble or the shortened header or both when transmitting subsequent frames between the devices; and
receive a connection assignment frame from the other device, the connection assignment frame using a preamble format and a header format defined in the protocol standard, the connection assignment frame comprising an application specific information element authorizing use of the truncated preamble or the shortened header or both when transmitting subsequent frames between the devices.

15. The device of claim 13, the processor further operating to:
receive a connection request frame from the other device, the connection request frame using a preamble format and a header format defined in the protocol standard, the connection request frame comprising an application specific information element requesting use of the truncated preamble or the shortened header or both when transmitting subsequent frames between the devices; and
send a connection assignment frame to the other device, the connection assignment frame using a preamble format and a header format defined in the protocol standard, the connection assignment frame comprising an application specific information element authorizing use of the truncated preamble or the shortened header or both when transmitting subsequent frames between the devices.

16. The device of claim 13, wherein the protocol standard is IEEE Std. 802.15.6-2012.

17. A device, comprising:
a circuit for sending signals to and receiving signals from another device using a defined protocol standard; and
a processor adapted to perform operations on the signals sent to or received from the other device, the processor operating to:
configure the circuit in the device to transmit and receive frames formatted with a truncated preamble or a shortened header or both, wherein the truncated preamble or the shortened header are not defined in the protocol standard;
send a first frame to the other device, the first frame comprising the truncated preamble or the shortened header or both; and receive a second frame from the other device, the second frame comprising the truncated preamble or the shortened header or both, wherein the header format defined in the protocol standard uses a spreading factor of 4 or 2 and the shortened header uses a spreading factor of 2 or 1.

* * * * *

UNITED STATES PATENT AND TRADEMARK OFFICE
CERTIFICATE OF CORRECTION

PATENT NO. : 8,830,941 B2
APPLICATION NO. : 13/614464
DATED : September 9, 2014
INVENTOR(S) : Jin-Meng Ho and Gangadhar Burra It is certified that error appears in the above-identified patent and that said Letters Patent is hereby corrected as shown below:

In the Specification

In column 1 after CROSS-REFERENCE TO RELATED APPLICATIONS: replace the first paragraph with;

This application claims the benefit of the filing date of U.S. Provisional Patent Application No. 61/534,412 which is titled "Turbo Modes for BAN Based Communications" and was filed September 14, 2011, the disclosure of which is hereby incorporated by reference herein in its entirety.

Signed and Sealed this
Eleventh Day of August, 2015

Michelle K. Lee
*Director of the United States Patent and Trademark Office*